United States Patent
Smits et al.

(10) Patent No.: US 8,046,540 B2
(45) Date of Patent: Oct. 25, 2011

(54) SHARED CLOSURES ON DEMAND

(75) Inventors: Thomas Smits, Epfenbach (DE); Jan Boris Dostert, Nussloch (DE); Oliver Patrick Schmidt, Woerth am Rhein (DE); Norbert Kuck, Karlsruhe (DE)

(73) Assignee: SAP AG, Walldorf (DE)

( * ) Notice: Subject to any disclaimer, the term of this patent is extended or adjusted under 35 U.S.C. 154(b) by 540 days.

(21) Appl. No.: 11/789,925

(22) Filed: Apr. 26, 2007

(65) Prior Publication Data

US 2008/0270709 A1    Oct. 30, 2008

(51) Int. Cl.
  *G06F 12/00*    (2006.01)
  *G06F 21/00*    (2006.01)
  *G06F 13/00*    (2006.01)
  *G06F 13/28*    (2006.01)
  *G06F 9/455*    (2006.01)

(52) U.S. Cl. .................. 711/147; 711/6; 711/130; 718/1

(58) Field of Classification Search .................. 711/130, 711/147, 203, 209; 717/100, 116; 718/1; 719/319

See application file for complete search history.

(56) References Cited

U.S. PATENT DOCUMENTS

| | | | |
|---|---|---|---|
| 6,694,346 B1 * | 2/2004 | Aman et al. | 718/104 |
| 6,728,746 B1 * | 4/2004 | Murase et al. | 718/1 |
| 7,203,944 B1 * | 4/2007 | van Rietschote et al. | 718/104 |
| 7,213,246 B1 * | 5/2007 | van Rietschote et al. | 718/1 |
| 2004/0123288 A1 * | 6/2004 | Bennett et al. | 718/1 |
| 2005/0262512 A1 * | 11/2005 | Schmidt et al. | 719/310 |
| 2005/0268298 A1 * | 12/2005 | Hunt et al. | 718/1 |
| 2006/0064549 A1 * | 3/2006 | Wintergerst | 711/134 |
| 2008/0126780 A1 * | 5/2008 | Rajkumari et al. | 713/2 |

* cited by examiner

*Primary Examiner* — Yaima Campos
(74) *Attorney, Agent, or Firm* — Blakely, Sokoloff, Taylor & Zafman

(57) ABSTRACT

A method and apparatus for copying data from a virtual machine to a shared closure on demand. This process improves system efficiency by avoiding the copying of data in the large number of cases where the same virtual machine is the next to request access and use of the data. Load balancing and failure recovery are supported by copying the data to the shared closure when the data is requested by another virtual machine or recovering the data from the failed virtual machine and storing it in the shared closure before a terminated virtual machine is discarded.

20 Claims, 6 Drawing Sheets

US 8,046,540 B2

SHARED CLOSURES ON DEMAND

BACKGROUND

1. Field of the Invention

The invention relates to virtual machine session data management. Specifically, the invention relates to copying data to a shared closure only on demand.

2. Background

In object oriented environments, such as the Java® platform by Sun Microsystems of Santa Clara, Calif., virtual machines are used to execute code for the platform. The virtual machines are executed by operating system processes and can be used to provide a server framework. The server framework may in turn provide a session manager and support a number of applications and similar services to clients. The state of each of the applications or application interfaces is referred to as a user session.

During the runtime of a platform a virtual machine may fail. As a result, user session data can be lost, causing loss of data and service for users. One common technique to protect against this loss is to store user session data in a persistent storage that is not affected by virtual machine failures. This technique is often referred to as 'session failover'. As a prerequisite for session failover, it must be possible to convert all objects that represent the user session into a form that may be stored in a persistent storage. Serialization is a feature of the Java® platform that allows objects to be transformed into a byte stream that may be stored in a persistent storage. Using this technique, all session objects are required to be serializable. A serializable object can be restored after session failover by the same virtual machine or another virtual machine. When a session manager determines that a session is to be persisted for storage in a persistent storage device, the complete user session is serialized and stored. However, this process involves a high performance cost. Converting and storing the objects of the session is a relatively slow process and diminishes overall system performance.

An alternative method of handling session failover utilizes shared closures. Shared closures provide an alternative mechanism for converting objects into a persistent form. In order to be usable with shared closures, session objects must be serializable and conform to additional restrictions to ensure that they can be transformed into their persistent state without having to execute user code. In this method a shared storage is utilized to allow multiple virtual machines to access the session objects and related data objects or 'shared closures.' A shared closure is an initial data object and transitive closure of all the objects that are references by this data object. These shared closures persist in shared memory even if a virtual machine fails. The session manager creates a shared closure for session objects instead of serializing them. Objects belonging to a session are traversed by the virtual machine code and copied to a shared memory block. This process is much faster than serialization.

However, session object data is still traversed and copied to the shared closure, which is only of benefit if the next request for the session is going to be processed in a different virtual machine. This traversal and copying occurs each time that something changes in the session data. In the case where the next request for the session data is from the same virtual machine, then the effort spent to copy the session data to the shared memory is wasted and the efficiency of the system reduced.

SUMMARY

Embodiments of the invention include a method and apparatus for copying shared data from a virtual machine to a shared closure on demand. This process improves system efficiency by avoiding the copying of data in the large number of cases where the same virtual machine is the next to request access and use of the data. Load balancing and failure recovery are supported by copying the data to the shared closure when the data is requested by another virtual machine or recovering the data from the failed virtual machine and storing it in the shared closure before a terminated virtual machine is discarded.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Figure 1:
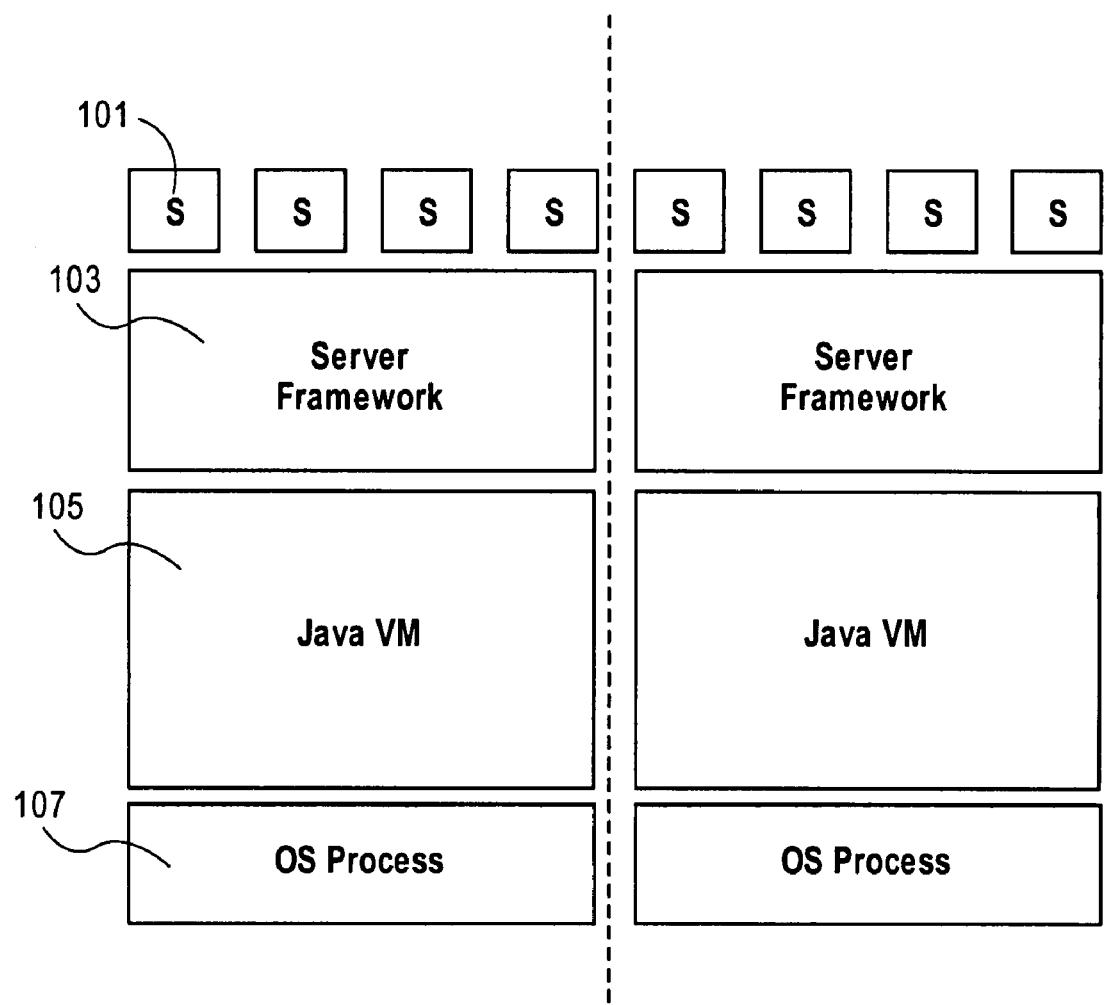
FIG. 1 is a diagram of one embodiment of the operating environment of the copy on demand system.

FIG. 1 is a diagram of one embodiment of the operating environment of the copy on demand system. In one embodiment, a system may provide a server framework 103 to a set of clients. As used herein, a set may refer to any number of items including one item. The server framework 103 may provide services to a client. The state of these services may be maintained as user sessions 101. In one embodiment, the sessions are maintained in the form of session objects. A server framework 103 may support any number of sessions 101. In one embodiment, an instance of an application or an application interface can constitute a user session 101. Each user session can generate one or more requests to be processed by the server framework 103. The requests can include instructions to be executed on a runtime system (e.g., the virtual machine 105) on the server framework 103. A runtime system is a code execution environment that executes instructions or code in user requests and that provides runtime services for that code.

One example of a runtime system is a virtual machine 105. A virtual machine 105 is an abstract machine that can include an instruction set, a set of registers, a stack, a heap, and a method area, like a real machine or processor. A virtual machine 105 acts as an interface between program code and the actual processor or hardware platform on which the program code is to be executed. The same program code can be executed on multiple processors or hardware platforms without having to be rewritten or re-compiled for each processor or hardware platform. Instead, a virtual machine 105 is implemented for each processor or hardware platform, and the same program code can be executed in each virtual machine.

In one embodiment, a server framework 103 is executed by a virtual machine 105 such as a Java® virtual machine. The virtual machine 105 executes user code such as server applications that service the client requests through the server framework. The virtual machine 105 is executed as a process 107 or set of processes of an operating system. An operating system process 107 is an allocation of resources and processing time to a program. Any operating system may provide the process and support this system including Microsoft Windows® by Microsoft Corp. of Redmond, Wash., Linux, Unix, OS X by Apple, Inc. of Cupertino, Calif. or similar operating systems.

Figure 2:
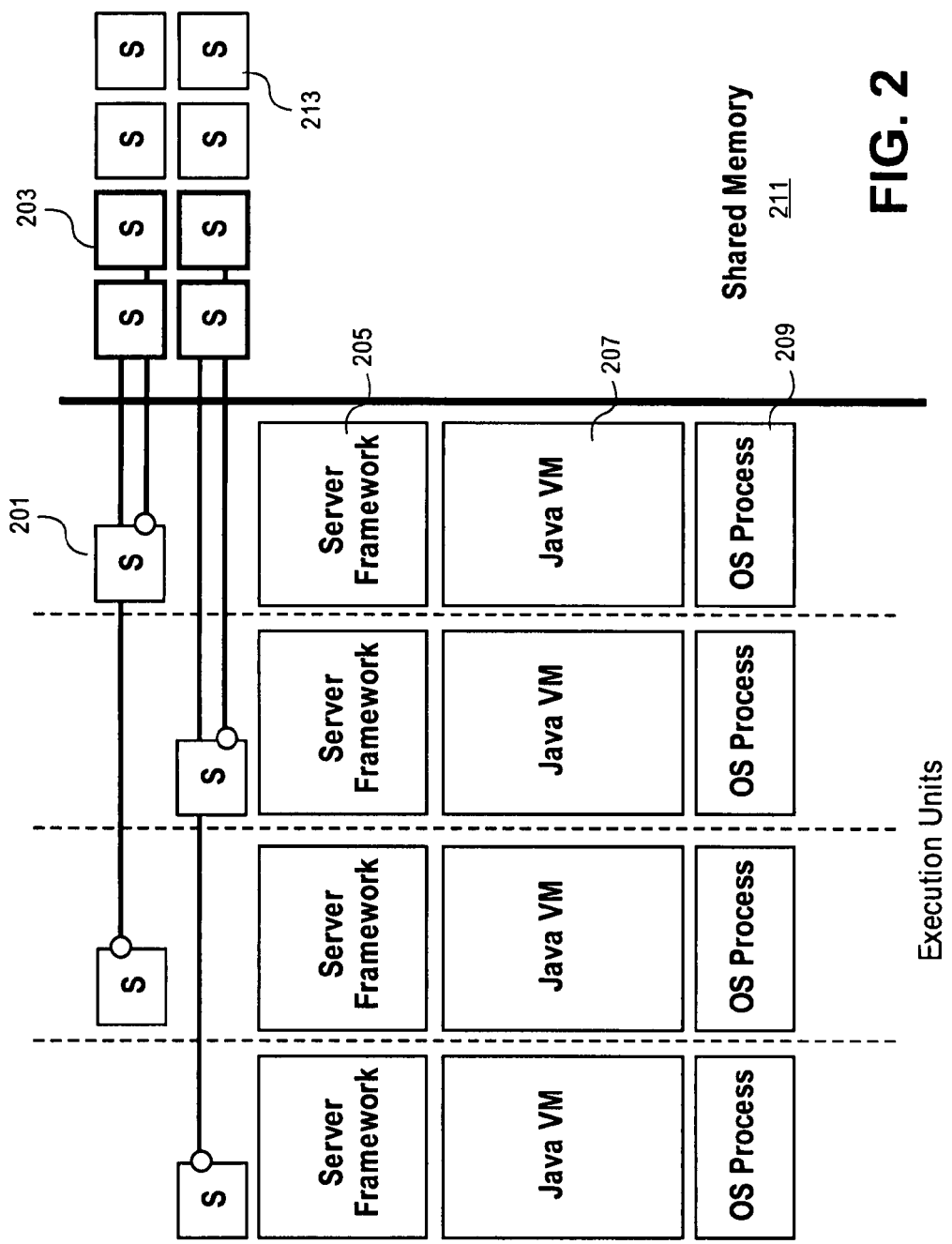
FIG. 2 is a diagram of one embodiment of the operating environment of the copy on demand system including shared memory.

FIG. 2 is a diagram of one embodiment of the operating environment of the copy on demand system including shared memory. In one embodiment, the operating environment may include a shared memory 211 that may be utilized by each of the sessions 201, server frameworks 205, virtual machines 207 or processes 209. The shared memory 211 may be used to transfer data between server frameworks 205, virtual machines 207 or processes 209. The shared memory 211 may be allotted from the system memory of a single machine, from a set of machines or from similar memory resources.

In one embodiment, session data 201 or session objects may be copied into the shared memory 211 and updated continuously to allow the session data to be transferred between virtual machines. The session data 201 may be copied at the time that a session is created and each change to the session may be similarly updated to the shared memory 211 to maintain an identical copy of session data 201 that may be used in the case that the virtual machine that is providing the session fails or if the server framework that supports the session is overburdened and the session is transferred to another server frame work to balance the load between servers. The copying of a session object to a shared memory may take the form of serialization or creation and maintenance of a shared closure. Each of these implementations consumes significant system resources, memory and processor time to effect the transformation of the object data to a persistent state. In the embodiments described herein, these resource intensive implementations are avoided by copying the shared closure into the shared memory only on demand instead of constantly maintaining and updating the shared closure.

In one embodiment, a pointer, reference 203 or similar location indicator is stored in shared memory 211 that provides a location in a virtual machine where session data 201 is located. This location in the virtual machine 207 may be a heap data structure or similar data structure that the virtual machine 207 uses for managing or working on data for applications and programs that it is executing. This reference 203 is updated intermittently if the session data is changed such that the location of the data is altered. The references 203 are used to recover session data from the virtual machine 207. The session data 201 is then stored 213 in shared memory 211 to be accessed by another virtual machine on demand. The use of the references allows the session data 201 to be accessed in the form it is kept by the virtual machine without the need to convert the session data 201 to a persistent form unless the session data 201 is required to be transferred.

In one embodiment, session data 201 or a portion of the session data is also stored 213 in the shared memory 211. Some applications or session data 201 may not be reliably recovered from the virtual machine after it terminates. This data may be continuously or intermittently copied during the operation of the virtual machine 207 to the shared memory 211. The session data stored in the shared memory 211 may be in any format or organization that allows the session data 201 to be subsequently utilized by another virtual machine.

Figure 3:
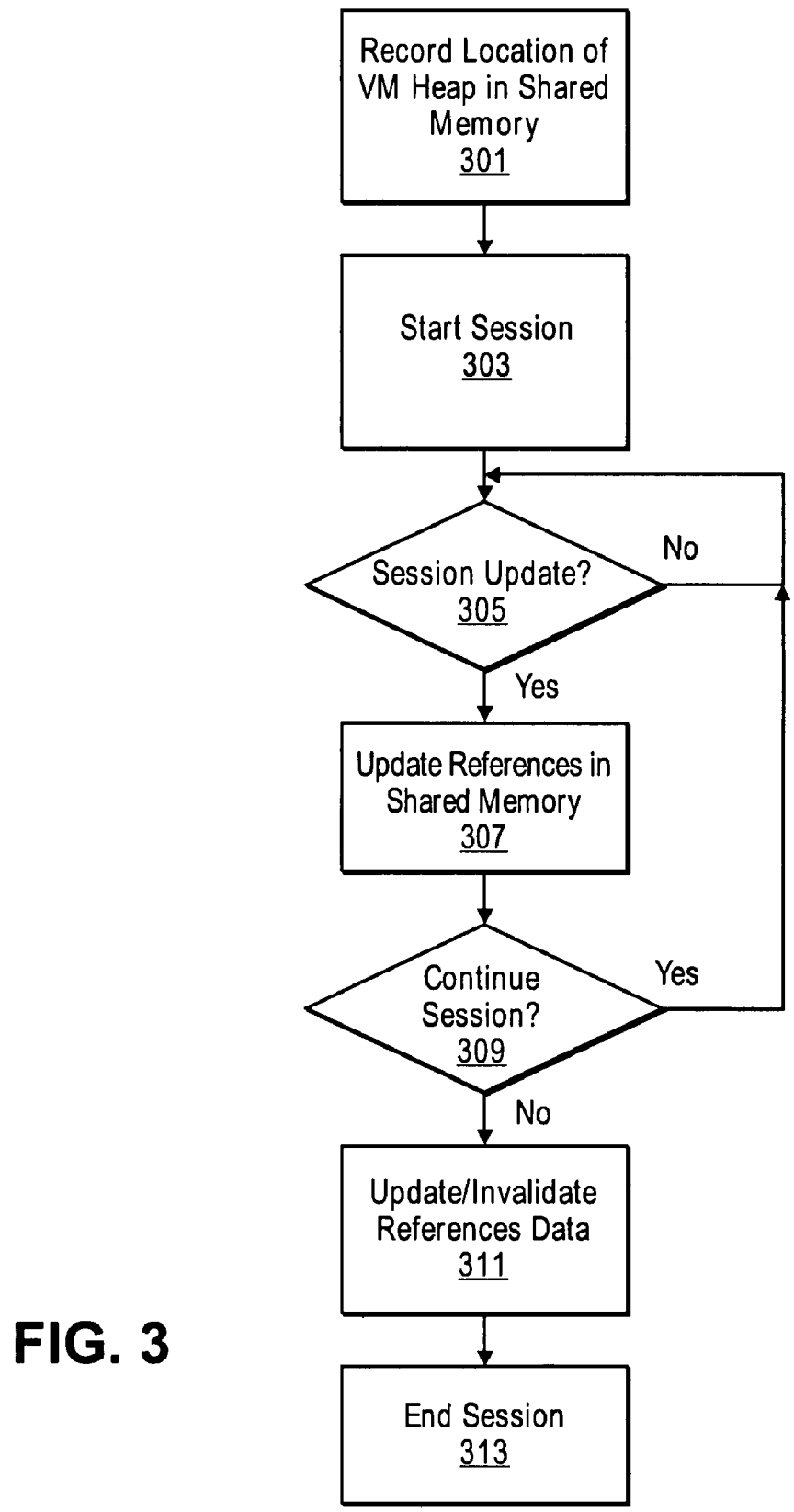
FIG. 3 is a flowchart of one embodiment of a process for tracking session data in the shared memory.

FIG. 3 is a flowchart of one embodiment of a process for tracking session data in the shared memory. In one embodiment, the copy on demand process is initiated at the time that a virtual machine is initiated or when memory in the virtual machine heap is allocated for an application or session. The location of the allocated memory in the heap or similar data structure or location is stored in the shared memory (block 301). The location is stored as a pointer, reference or similar location indicator.

In one embodiment, a session is initiated (block 303) associated with a virtual machine. The virtual machine uses the allocated space in the heap to store and work on session data. As session data is updated, a check is made by a session manager or a notice may be generated by the virtual machine to the session manager (block 305) such that the session manager or a similar copy on demand component is aware of the change in session data. An update to session data may be in the form of a session dialogue action or similar change. If no update occurs or if an update does not affect the location of the session data in the heap, then no action needs to be taken to update the stored information in the shared memory. If the session data has been updated and the update to the session data affects the location or retrieval of the session data, then a notice is sent to a session manager or similar copy on demand component that updates the pointer in the shared memory (block 307). In another embodiment, the virtual machine handles the updating of the pointer data in the shared memory.

The monitoring of the session data and updating of the pointers may continue throughout the time that the session is active. The end of the session is checked for or detected by the session manager (block 309). In another embodiment, the virtual machine notifies the session manager of the session termination. If the session ends, then the pointer data in shared memory associated with the session is removed or marked as invalid (block 311). The virtual machine then ends the session (block 313). The virtual machine then deallocates the memory or space on the heap that was allocated to the session data.

Figure 4:
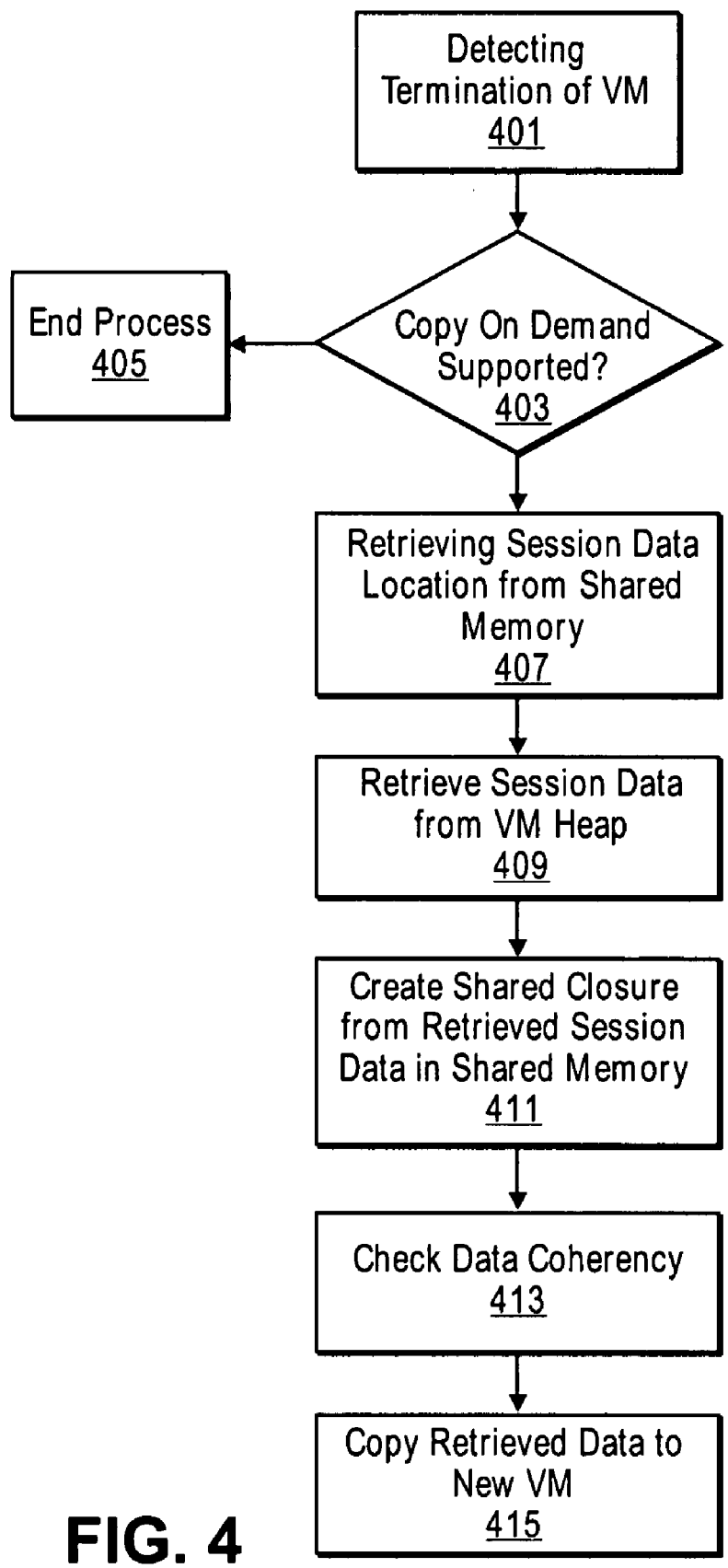
FIG. 4 is a flowchart of one embodiment of a process for recovering data from a terminated virtual machine.

FIG. 4 is a flowchart of one embodiment of a process for recovering data from a terminated virtual machine. A virtual machine may fail due to an error in its own execution or the execution of an application by the virtual machine. The virtual machine may fail if the physical machine on which it is working fails or insufficient resources are available for the execution of the virtual machine or under similar circumstances. If a virtual machine is terminated that supports the copy on demand system, then the data from the virtual machine must be recovered before the virtual machine is discarded. A virtual machine is discarded to recover the resources associated with the virtual machines such as memory space, open files and similar resources.

In one embodiment, the reclamation of the memory of the virtual machine after it terminates is accomplished using exception or signal handlers. A signal or exception handler is called if a potential crash is detected by the session manager, the operating system or similar component. The signal or exception handler performs the actions detailed below. In another embodiment, the heap of all virtual machines may be maintained in shared memory. A single virtual machine at a time would access this portion of shared memory. This portion of the shared memory can be controlled more easily than the lifetime of a process associated with a virtual machine whose resources are reclaimed by an operating system upon termination. This implementation offers greater protection for process or virtual machine terminations that are non-interruptible or difficult to detect. For example, a "kill-9" command of the UNIX operating system is uninterruptible.

Each of these techniques enable the system to keep the virtual machines heap memory accessible after the process terminates. The heap memory alone is sufficient to transform the session objects into their persistent state using shared closures. In contrast to that, transforming session objects to their persistent state using serialization would require execution of program code in the terminated process, which can not easily be accomplished and is therefore not relied upon.

By way of example, in one embodiment, the process of recovering the data from the virtual machine is initiated when a session manager or session data tracking component detects the failure of a virtual machine (block 401). The termination is detected by the generation of an error message by the virtual machine, the underlying operating system process or by a similar mechanism. A notification or message is then sent to a session manager or similar copy on demand component.

A check is made for each failed or terminating virtual machine that is detected to determine if it supports or relies on the copy on demand system (block 403). In one embodiment, support is determined by searching shared memory for pointer or reference data for the failed virtual machine. If the terminated virtual machine does not support or rely on the copy on demand system, then the virtual machine and its process resources are reclaimed by the operating system or similarly discarded (block 405).

If the terminated virtual machine does support or rely on the copy on demand system, then the session manager retrieves data from the terminated virtual machine before it is discarded. The session manager retrieves the session data location data (e.g., a pointer, reference or similar location data) from the shared memory (block 407). The session data may be at a known location for each virtual machine or the session manager or session data tracking component may track the storage locations for each virtual machine or each session in shared memory or similar storage location.

The session manager utilizes the session data pointer for each session associated with the terminated virtual machine to access the virtual machine heap and retrieve the session data stored therein (block 409). The retrieved data is used to create a shared closure from the session object and store the newly created shared closure in shared memory (block 411). The location in the shared memory may be a location that is well known or tracked by the session manager or similar components. Copying the data only after termination or upon demand saves system resources from having to convert this data to a persistent form and copy this data to shared memory in scenarios where the session data is continuously or repeatedly used by the same virtual machine. The data is copied only when needed by another virtual machine, such as when the virtual machine fails or load balancing leads to the session being moved to another virtual machine. In these and similar scenarios another virtual machine may then support the session and loads the session data from the shared memory to continue the session without interruption or at least without significant interruption.

The data that has been copied to the shared memory is checked to determine if the data is coherent or if it was corrupted before it was retrieved (block 413). For example, the session data may have been corrupted by whatever issue caused the virtual machine to fail. If the data is corrupt, then the data is discarded and an error is generated. If the data is not corrupt, then the data is accessed and copied by another virtual machine to continue support for the session (block 415). Error checking, as used herein, encompasses any type of error checking mechanism or techniques including checksums and similar error checking mechanisms. The new virtual machine assigned to support the session that was previously supported by the now terminated virtual machine may have been an already running virtual machine or a newly generated virtual machine or newly instantiated virtual machine created to replace the failed virtual machine. In another embodiment, the new virtual machine starts at an earlier point prior to termination based on error correction or similar factors.

Figure 5:
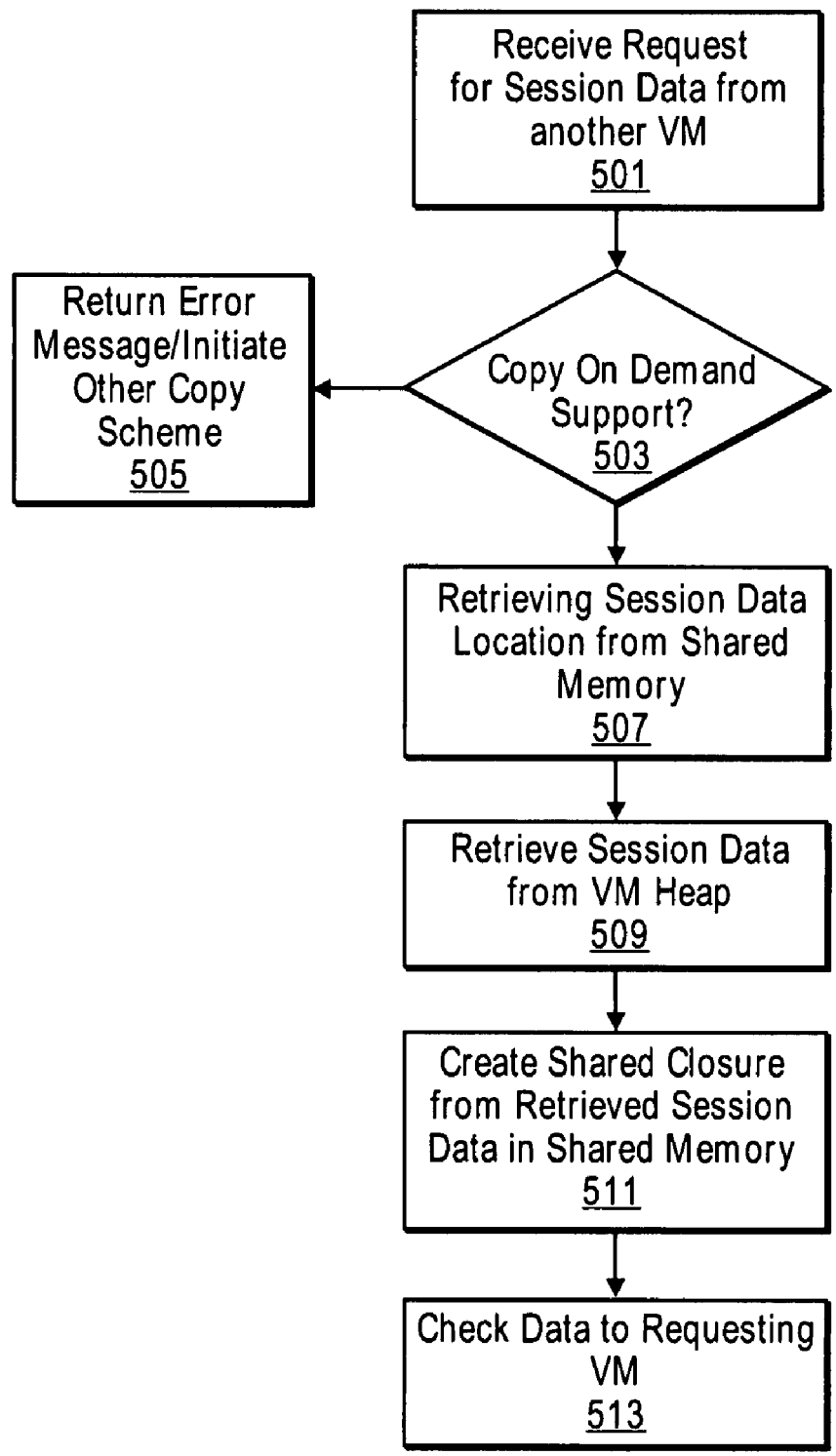
FIG. 5 is a flowchart of one embodiment of a process for transferring session data from a first virtual machine to a second virtual machine.

FIG. 5 is a flowchart of one embodiment of a process for transferring session data from a first virtual machine to a second virtual machine. In one embodiment, session data is transferred from a first virtual machine to a second virtual machine upon request of the second virtual machine, a load balancing component or similar process or program (block 501). This transferring process is used to support load balancing or similar processes.

In one embodiment, a check is made by the session manager or similar component to determine if the virtual machine or session that is to receive the request for the session data supports the copy on demand system (block 503). If the virtual machine or session does not support the copy on demand system then the requested data is retrieved by other methods such as serialization or a similar system or an error message may be returned to the requesting program (block 505). For example, the virtual machine or session may use shared closures to copy all session data to the shared memory as it is updated and the data does not need to be retrieved from the current virtual machine executing the session.

If the session or virtual machine does support the copy on demand system then the session manager retrieves the reference to the session data from the shared memory directly (block 507). The reference or similar location data may be stored in a known location in the shared memory or the session manager may track the location of the pointer data. The data may be retrieved using any data retrieval mechanism.

The session manager uses the location data to retrieve session data from a virtual machine (block 509). The session manager copies the data directly from the virtual machine's heap or requests the data from the virtual machine. The retrieved data is used to create a shared closure from the session object and store the newly created shared closure in shared memory (block 511). The data copied to the shared memory is then accessed by or copied to a virtual machine assigned to continue execution of the session (block 513). The session continues execution transparent to the client interacting with the server through the session.

Figure 6:
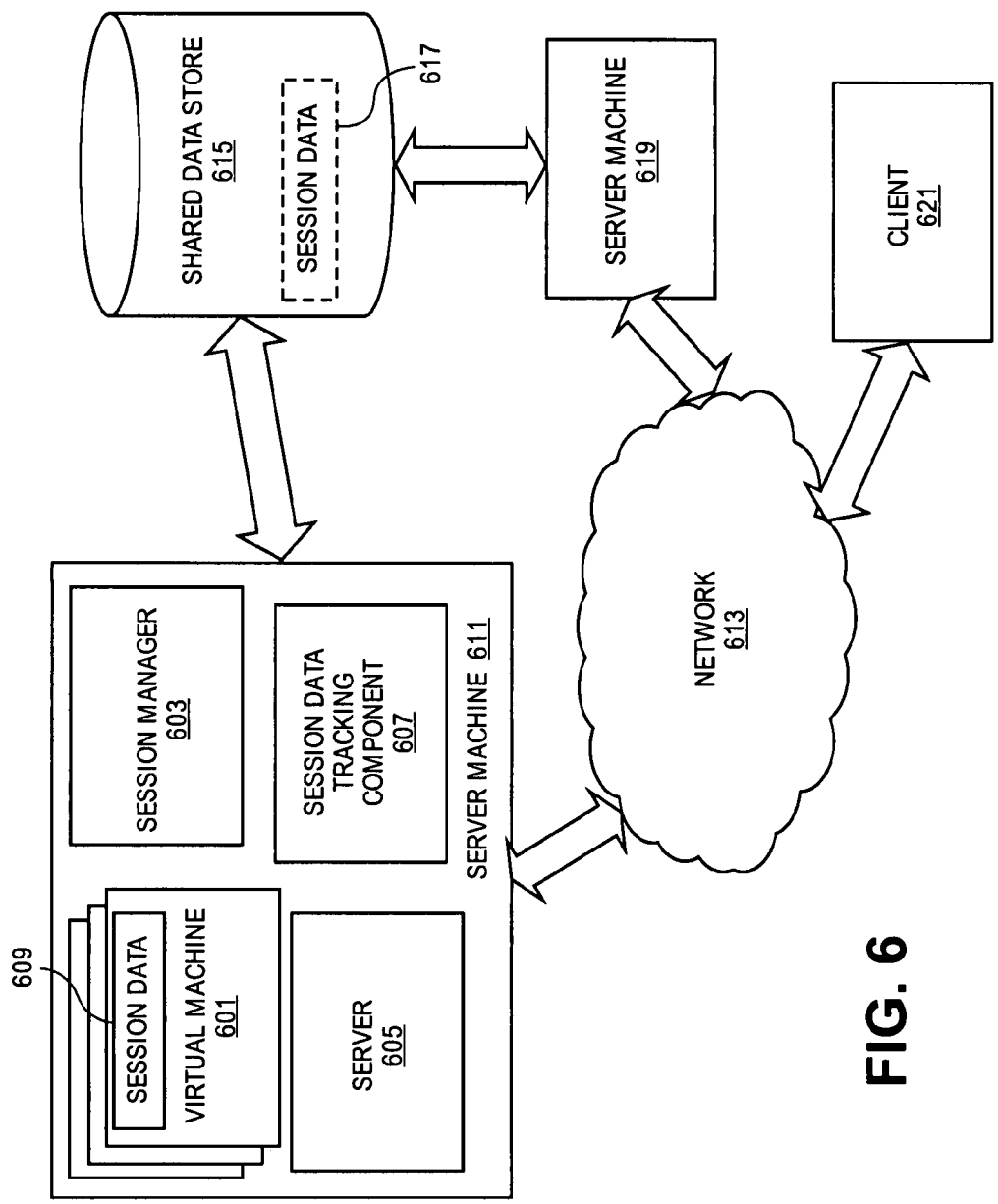
FIG. 6 is a diagram of one embodiment of a copy on demand system.

FIG. 6 is a diagram of one embodiment of a copy on demand system. In one embodiment, the system may include at least one server machine 611 providing a server 605. The server 605 provides services to other servers 619, clients 621 or similar applications or machines. The server machine 611 and server 605 may be in communication with other servers 619, clients 621 or similar machines or applications over a network 613. The network 613 may be a local area network (LAN), wide area network (WAN), such as the Internet, or similar communication network.

The server 605 may be provided or executed by a virtual machine 601 or set of virtual machines. The virtual machine 601 may track data related to communication data and working data shared between the server application 605 and the client 621, other servers 619 as session data 609. The session data 609 may contain any data or data structures that are necessary to support and maintain the session between the server 605 and client 621.

The server machine 611 may also support other components in addition to the server 605, such as a session manager 603, session data tracking component 607 and similar modules, applications and components. The session manager 603 may provide services to virtual machines operating the servers 605 to allow for the transfer of sessions between virtual machines, recovery of session data and similar functionality. The session data tracking component 607 may monitor session data 609 and update pointers stored in shared memory 615 that indicate the location of the data relevant to each session.

The shared data store 615 may be any storage device including a fixed disk, random access memory, removable media and similar storage devices. The shared data store 615 may be accessible to the server machine 611, other servers 619 and similar machines and locations. Each machine may communicate with the main data store 615 through a network connection. The data store 615 may contain elements including session data, pointers to session data 617, and similar data. The storage of the session pointers allows for the transfer of the session data from a dead or dying virtual machine to a new virtual machine that can continue to support the session. The virtual machine may be executing on any machine. Each machine may be tied to the network and can access the shared memory via direct communication over a bus or similar communication medium, through a local area network or over a wide area network.

In one embodiment, the copy on demand system may be implemented as hardware devices. In another embodiment, these components may be implemented in software (e.g., microcode, assembly language or higher level languages). These software implementations may be stored on a machine-readable medium. A "machine readable" medium may include any medium that can store information. Examples of a machine readable medium include a ROM, a floppy diskette, a CD-ROM, a DVD, flash memory, hard drive, an optical disk or similar medium.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method comprising:
monitoring session data of a first virtual machine;
storing an indicator in a shared memory location, the indicator providing a location of the session data of the first virtual machine in a heap memory of the first virtual machine;
detecting a termination of the first virtual machine caused by a failure of the first virtual machine; and
copying the session data from the heap memory of the first virtual machine to the shared memory after the termination of the first virtual machine, using the indicator stored in the shared memory location to locate the session data in the first virtual machine.

2. The method of claim 1, wherein copying the session data comprises:
retrieving the session data from the first virtual machine at the location.

3. The method of claim 2, wherein the session data is retrieved in response to a request from a second virtual machine as a copy on demand process.

4. The method of claim 1, further comprising:
updating the indicator in response to a session dialogue action.

5. The method of claim 1, wherein the session data is stored as a shared closure in the shared memory.

6. The method of claim 1, further comprising:
checking for the indicator upon detection of termination of the first virtual machine.

7. The method of claim 1, further comprising:
checking the session data at the location for coherency.

8. The method of claim 1, wherein the session data is reclaimed from the terminated first virtual machine prior to discard of the first virtual machine and without maintaining a copy of the session data in the shared memory prior to termination.

9. A system comprising:
a shared memory component;
a first virtual machine to service an application server; and
a session manager to store an indicator of session data location in a heap memory within the first virtual machine, the indicator stored in the shared memory component, the session manager to copy session data of the first virtual machine from the heap memory to the shared memory component, after detecting a failure of the first virtual machine, using the indicator stored in the shared memory component to locate the session data in the heap memory of the first virtual machine.

10. The system of claim 9, wherein the session manager copies the session data at the location in response to a request from a second virtual machine.

11. The system of claim 9, further comprising:
a session data tracking component to store the indicator.

12. The system of claim 9, wherein the session data is reclaimed from the terminated first virtual machine prior to discard of the first virtual machine and without maintaining a copy of the session data in the shared memory component prior to termination.

13. A non-transitory machine readable medium having instructions stored therein, which if executed by a machine, cause the machine to perform a set of operations comprising:
tracking session activity of a first virtual machine; and
updating a set of references to data in a shared memory in response to session activity, the set of references indicating a location of session data in a heap structure in the first virtual machine;
detecting a termination of the first virtual machine caused by a failure of the first virtual machine; and
copying the session data from the heap structure of the first virtual machine to the shared memory after the termination of the first virtual machine, using the set of references in the shared memory to locate the session data in the heap structure of the first virtual machine.

14. The non-transitory machine readable medium of claim 13, wherein copying the session data from the first virtual machine to a shared memory location is in response to a request from a second virtual machine.

15. The non-transitory machine readable medium of claim 14, wherein the session data is stored in shared memory as a shared closure.

16. The non-transitory machine readable medium of claim 13, having further instructions stored therein, which if executed by a machine, cause the machine to perform a set of further operations comprising:
error checking session data at the location if the first virtual machine failed.

17. The non-transitory machine readable medium of claim 13, having further instructions stored therein, which if executed by a machine, cause the machine to perform a set of further operations comprising:

maintaining a heap of the first virtual machine after failure until heap data is retrieved.

18. The non-transitory machine readable medium of claim 13, having further instructions stored therein, which if executed by a machine, cause the machine to perform a set of further operations comprising:
    searching shared memory for the set of references corresponding to the first virtual machine to determine support for on demand shared closures for the first virtual machine.

19. The non-transitory machine readable medium of claim 18, having further instructions stored therein, which if executed by a machine, cause the machine to perform a set of further operations comprising:
    updating the set of references in response to a session dialogue action.

20. The non-transitory machine-readable medium of claim 13, wherein the session data is reclaimed from the terminated first virtual machine prior to discard of the first virtual machine and without maintaining a copy of the session data in the shared memory prior to termination.

* * * * *